United States Patent
Hanihara et al.

[11] Patent Number: 5,990,988
[45] Date of Patent: Nov. 23, 1999

[54] REFLECTION LIQUID CRYSTAL DISPLAY AND A SEMICONDUCTOR DEVICE FOR THE DISPLAY

[75] Inventors: Koji Hanihara; Itaru Tsuchiya; Kenichi Hanada; Kunihisa Ishii; Motohisa Ohkuni, all of Yamanashi-ken, Japan

[73] Assignees: Pioneer Electric Corporation, Tokyo, Japan; Pioneer Video Corporation, Yamanashi-ken, Japan

[21] Appl. No.: 08/697,867

[22] Filed: Aug. 30, 1996

[30] Foreign Application Priority Data

Sep. 1, 1995 [JP] Japan .................................. 7-225559
Sep. 1, 1995 [JP] Japan .................................. 7-225560
Sep. 1, 1995 [JP] Japan .................................. 7-225561

[51] Int. Cl.$^6$ ........................... G02F 1/136; G02F 1/1343
[52] U.S. Cl. .......................... 349/48; 349/114; 349/122; 349/143; 257/351
[58] Field of Search ............................ 349/42, 110, 43, 349/111, 48, 122, 139, 147, 113, 114; 257/72, 351, 369; 345/92, 93

[56] References Cited

U.S. PATENT DOCUMENTS

| | | |
|---|---|---|
| 5,056,895 | 10/1991 | Kahn . |
| 5,351,145 | 9/1994 | Miyata et al. ............................ 349/48 |
| 5,365,355 | 11/1994 | Hastings, III et al. .................. 349/110 |
| 5,461,501 | 10/1995 | Sato et al. ................................ 349/111 |

FOREIGN PATENT DOCUMENTS

| | | |
|---|---|---|
| 4-56827 | 2/1992 | Japan . |
| 5-93922 | 4/1993 | Japan . |
| 6-148679 | 5/1994 | Japan . |

*Primary Examiner*—William L. Sikes
*Assistant Examiner*—Tai V. Duong
*Attorney, Agent, or Firm*—Morgan, Lewis & Bockius LLP

[57] ABSTRACT

A liquid crystal display device has a semiconductor substrate. A plurality of switching elements are arranged on the substrate in matrix, and a plurality of pixel electrodes are provided above the switching elements, arranged in matrix corresponding to the switching elements. A liquid crystal layer is provided on the pixel electrodes. The switching element is connected with a corresponding pixel electrode by a wiring layer. Dummy layers are provided in the same level as the wiring layer so that a surface of the dummy layer is substantially flush with a surface of the wiring layer.

16 Claims, 13 Drawing Sheets

PRIOR ART

REFLECTION LIQUID CRYSTAL DISPLAY AND A SEMICONDUCTOR DEVICE FOR THE DISPLAY

BACKGROUND OF THE INVENTION

The present invention relates to a reflection type liquid crystal display (LCD) device, and more particularly to an LCD device provided with a miniaturized reflection panel having a good reflectivity and a controllability, so as to be preferably applied to an image projector.

A conventional LCD panel generally uses a TFT (Thin Film Transistor) as a switching element for each pixel. Although the TFT is advantageous in manufacturing a large sized LCD panel and in decreasing the manufacturing cost thereof, the driving capacity thereof is liable to be small. Moreover as shown in FIG. 9, there occurs a parasitic capacitance $C_{SD}$ between the source and the drain of the transistor, thereby causing the fluctuation of the driving voltage applied to the corresponding pixel even after the transistor is turned off.

Hence in a field where the miniaturizing of the LCD panel is emphasized rather than the enlargement thereof, MOS transistors have come to be used as the switching elements. Moreover, reflection panels are employed in order to obtain a higher aperture rate.

In order to obtain desired switching characteristics for appropriately driving each pixel in miniaturized LCD panel, which is employed in an image projector for example, it is necessary for each MOS transistor to have an area approximate to that of the pixel electrode. When the transistors are formed on the same plane as the pixel electrodes, thereby defining the region of the electrodes, the aperture rate is too small for obtaining the desired efficiency. Thus, the pixel electrodes are disposed above the transistors, thereby forming a display panel of a layered construction. However, in the layered construction, the pixel electrode must be formed over various elements such as the transistors and the wirings. Hence the pixel electrodes cannot be disposed horizontally and the surfaces thereof become bumpy. Hence, the reflecting surface of the panel becomes uneven, thereby resulting in the deterioration of the reflecting characteristics such as the reflectance and the polarization controllability.

Japanese Patent Application Laid-Open 4-56827 discloses a conventional reflection LCD panel, as shown in section in FIG. 10, which aims to solve the problem. Referring to the figure, the display panel comprises a silicon substrate 1, opposite glass substrates 6, and a liquid crystal layer 9 sealed between the substrates 1 and 6. On the silicon substrate 1, MOSFETs 2 are provided in a matrix, and pixel electrodes 4 are provided also on the substrate 1 in a matrix, interposing an insulation layer 3. A protection layer 5 is further provided on the MOSFETs 2 and the electrodes 4. On the entire substrate 6, a transparent electrode 7 is provided on the side of the liquid crystal layer 9. On the transparent electrode 7, a black matrix or black stripes 9b are formed at portions confronting the MOSFETs 2. The pixel electrodes 4 are provided only at the areas above storage capacitor electrodes 4a so that the upper surface of the pixel electrode 4 becomes flat.

The above described display panel is advantageous in that the pixel electrodes 4 are formed only in areas where the layer under the pixel electrodes 4 is flat and evenly disposed. Hence, the reflecting surface becomes flat, thereby improving the reflecting characteristics. However, only a portion of the reflecting surface can be made flat so that the black matrix 9b must be provided on the glass substrate 6 at the portions which oppose the transistors 2 and other wirings formed on the silicon substrate 1. Thus the aperture rate of the panel is decreased. Moreover, a complicated and difficult positioning procedure is necessary when assembling the silicon and glass substrates.

Japanese Patent Application Laid-Open 6-148679 discloses another conventional reflection LCD panel wherein the pixel electrodes and the protection layer are ground to flatten the reflecting surface.

More particularly, referring to FIG. 11a, the MOSFETs 2a provided in the form of a matrix are disposed on the silicon substrate 1a. The pixel electrodes 4b are also formed on the substrate 1a in a matrix through the insulation layer 3a. The protection layer 5a covers the pixel electrodes 4b. The surfaces of the electrodes 4b and the protection layer 5a are ground so that the reflecting surface becomes flat.

In order to form an even and flat reflecting surface, the pixel electrodes must initially have a thickness much larger than that of the ordinary electrodes, thereby taking more time to laminate the material. Moreover, the electrode must be ground until the surface thereof is even. Although such a display panel can be experimentally produced, due to the increase of the processing cost, it is not preferable in actual production. In addition, the panel has portions where conductive patterns dominate and portions comprising between-layer films in which conductive patterns are disposed, isolated from one another. These portions have different finish when ground so that it is difficult to render the entire surface flat.

The display panel has further disadvantages.

When the MOSFET 2a is rendered conductive, driving voltage is quickly applied to the molecules in the liquid crystal layer 9a through the pixel electrode 4b. When the MOSFET 2a becomes inconductive, the load and the applied voltage are held at a storage capacitor electrode, so that the polarization of the liquid crystal can be controlled.

Referring to FIG. 11b showing an equivalent circuit of the display panel, there are generated a parasitic capacitance $C_{NG}$ between the gate G and the drain D of the MOSFET 2a, and a parasitic resistance $R_{ND}$ between the drain D of the MOSFET 2a and the silicon substrate 1a which is connected to other elements such as a backgate. When the source S of the MOSFET 2a is applied with a data signal through an electrode $A_2$, the liquid crystal layer 9a is applied with the driving voltage. A part of the voltage of a signal applied to the gate G through an electrode $Y_2$ is added to the driving voltage through the parasitic capacitance $C_{NG}$. Thus the driving voltage is fluctuated. Furthermore, the electric current may leak from the pixel electrode 4a through the parasitic resistance $R_{ND}$ even when the MOSFET 2a is turned off. This also causes the fluctuation of the driving voltage. In addition, the voltage between the source S and the silicon substrate 1a fluctuates in accordance with the data signal, thereby decreasing the dynamic range of the MOSFET.

It is hence necessary to eliminate the undesirable influences of the parasitic capacitance and parasitic resistance. From the point of the manufacturing technique and the manufacturing cost, the means for eliminating the influences is preferably compatible with the existing conventional manufacturing devices.

The conventional MOSFET provided in the above described display panels usually has the lightly doped drain-source (LDD) structure as shown in FIGS. 12a and 12b. In the MOSFET 2b, a silicon oxide film 2c is formed on either side of a gate electrode G. Silicon is implanted in the substrate so that there are formed a p⁺ drain region, namely, a highly doped region 2d wherein the density of the impurities is high, and a p⁻ drain region, namely, a lightly doped region 2e adjacent the highly doped region 2d where the density of the impurities is low under the silicon oxide film 2c. Since the highly doped region 2d is disposed between the gate and the drain, the maximum intensity of the electric field adjacent the drain is decreased. Accordingly, it is possible to miniaturize the MOSFET which becomes conductive when applied with the voltage of about 5 volts, which is the level of the supply voltage of the ICs in general. Namely, the MOSFET with the channel length of about 1.2 μm can be manufactured.

The driving voltage needed to control the polarization of the liquid crystal molecules is generally between 15 and 20 volts. In order that the MOSFET for switching on and off the driving voltage has a sufficient withstand voltage, that is, the maximum voltage which the MOSFET is able to sustain without breaking down, the lightly doped region 2e must have a length of about 1.5 to 2 μm taking into account the possibility that twice as much voltage may happen to be fed. However, in the LDD structure, since the thickness of the silicon oxide film 2c must be considered, the lightly doped region 2e can only be formed with a length of about 0.2 to 0.3 μm, namely decreasing the withstand voltage. Hence, although the MOSFET can be made smaller, the operational reliability is decreased.

FIGS. 13a and 13b show another conventional structure of the MOSFET disclosed in Japanese Patent Application Laid-Open 5-93922. Such a structure is called the drift channel structure, and is intended to solve the above mentioned problem by decreasing the intensity of the electric field adjacent the drain D.

As shown in FIG. 13b, a field oxidation film 3a is formed as a mask on the substrate. When ions are implanted, the lightly doped region 2e is formed adjacent the highly doped region 2d under the field oxidation film 3a. The lightly doped region 2e thus formed between the gate and the drain has a long length so that a withstand voltage larger than the liquid crystal driving voltage is obtained.

On the other hand, in the case of a miniaturized MOSFET having a channel length of about 1.2 μm, the minimum width of the field oxidation film inevitably becomes about 2.4 μm which is approximately the double of the channel length. The length of the lightly doped region 2e is accordingly increased to more than 2.4 μm which is larger than the above described optimum length of 1.5 to 2.0 μm. Hence, although a large withstand voltage of the MOSFET is obtained, a sufficient miniaturization thereof cannot be realized in the drift channel structure.

SUMMARY OF THE INVENTION

An object of the present invention is to provide an improved reflection LCD wherein the liquid crystal panel thereof is miniaturized, easy to manufacture, and the liquid crystal molecules provided therein are accurately controlled.

Another object of the invention is to provided a reliable and a miniaturized semiconductor device such as a transistor for the LCD.

Another object is to provide a method for manufacturing the semiconductor device.

According to the present invention, there is provided a reflection liquid crystal display device having a semiconductor substrate, comprising a plurality of switching elements arranged on the substrate in matrix, a plurality of pixel electrodes provided above the switching elements, arranged in matrix corresponding to the switching elements, a unit of wiring layers connecting a unit of the switching elements with each other and connecting the unit of the switching elements with a corresponding pixel electrode, respectively, a liquid crystal layer provided on the pixel electrodes, a unit of dummy layers provided in the same level as the unit of the wiring layers so that an uppermost surface of the unit of the dummy layers is substantially flush with an uppermost surface of the unit of the wiring layers.

The surface of the pixel electrode on the side of the liquid crystal layer is ground so as to become flat.

A protection layer having a ground flat surface may be disposed on the pixel electrodes, and a dielectric mirror may be disposed on the protection layer.

The present invention further provides a reflection liquid crystal display device having a semiconductor substrate, comprising a plurality of switching elements arranged on the substrate in matrix, a plurality of pixel electrodes provided above the switching elements, arranged in matrix corresponding to the switching elements, a unit of wiring layers connecting a unit of the switching elements with each other and connecting the unit of the switching elements with a corresponding pixel electrode, respectively, a liquid crystal layer provided on the pixel electrodes, the unit of the switching elements comprising a p-channel MOSFET and an n-channel MOSFET which are connected to form a transfer gate for the pixel electrode.

Further, there is provided a semiconductor device having a semiconductor substrate on which a MOS transistor having a source and a drain is formed, comprising each of the source and the drain comprising an annular lightly doped region, and a highly doped region formed in the annular lightly doped region.

The lightly doped region has a width between a gate of the transistor and the highly doped region set to have a predetermined withstand voltage.

The present invention further provides a reflection liquid crystal display device having a semiconductor substrate, comprising a plurality of switching elements arranged on the substrate in matrix, a plurality of pixel electrodes provided above the switching elements, arranged in matrix corresponding to the switching elements, a unit of wiring layers connecting a unit of the switching elements with each other and connecting the unit of the switching elements with a corresponding pixel electrode, respectively, a liquid crystal layer provided on the pixel electrodes, a MOS transistor having a source and a drain formed on the substrate, each of the source and the drain comprising an annular lightly doped region, and a highly doped region formed in the annular lightly doped region.

Furthermore, there is provided a method for making a MOS transistor having a source and a drain formed on a semiconductor substrate, comprising the steps of forming a first well of a first conductive type in the semiconductor substrate, forming a second well of a second conductive type in the semiconductor substrate, forming a field oxidation film on a periphery of each of the first and second wells, forming a gate oxidation film on each of the first and second wells, forming a gate on the gate oxidation film, forming a lightly doped region on the gate on each of the first and second well, forming an insulation film having an opening at the lightly doped region on the field oxidation film and the lightly doped region, forming a highly doped region in the lightly doped region at the opening.

These and other objects and features of the present invention will become more apparent from the following detailed description with reference to the accompanying drawings.

BRIEF DESCRIPTION OF DRAWINGS

FIG. 4a is an enlarged diagram of FIG. 2 showing a switching element provided in the LCD panel;

FIG. 4b is a circuitry of the switching element of FIG. 4a;

FIG. 5a is a plan view of a p-channel MOSFET of the present invention;

FIG. 5b is a sectional view of the MOSFET of FIG. 5a;

FIG. 6a is a plan view of an n-channel MOSFET of the present invention;

FIG. 6b is a sectional view of the MOSFET of FIG. 6a;

FIG. 11a is a sectional view showing a part of another conventional reflection LCD panel;

FIG. 11b is a schematic diagram of an equivalent circuit of the LCD panel of FIG. 11a;

FIG. 12a is a plan view of a conventional MOSFET having an LDD structure;

FIG. 12b is a sectional view of the MOSFET of FIG. 12a;

FIG. 13a is a plan view of a conventional MOSFET having a drift channel structure; and FIG. 13b is a sectional view of the MOSFET of FIG. 13a.

DETAILED DESCRIPTION OF THE PREFERRED EMBODIMENT

Figure 1:
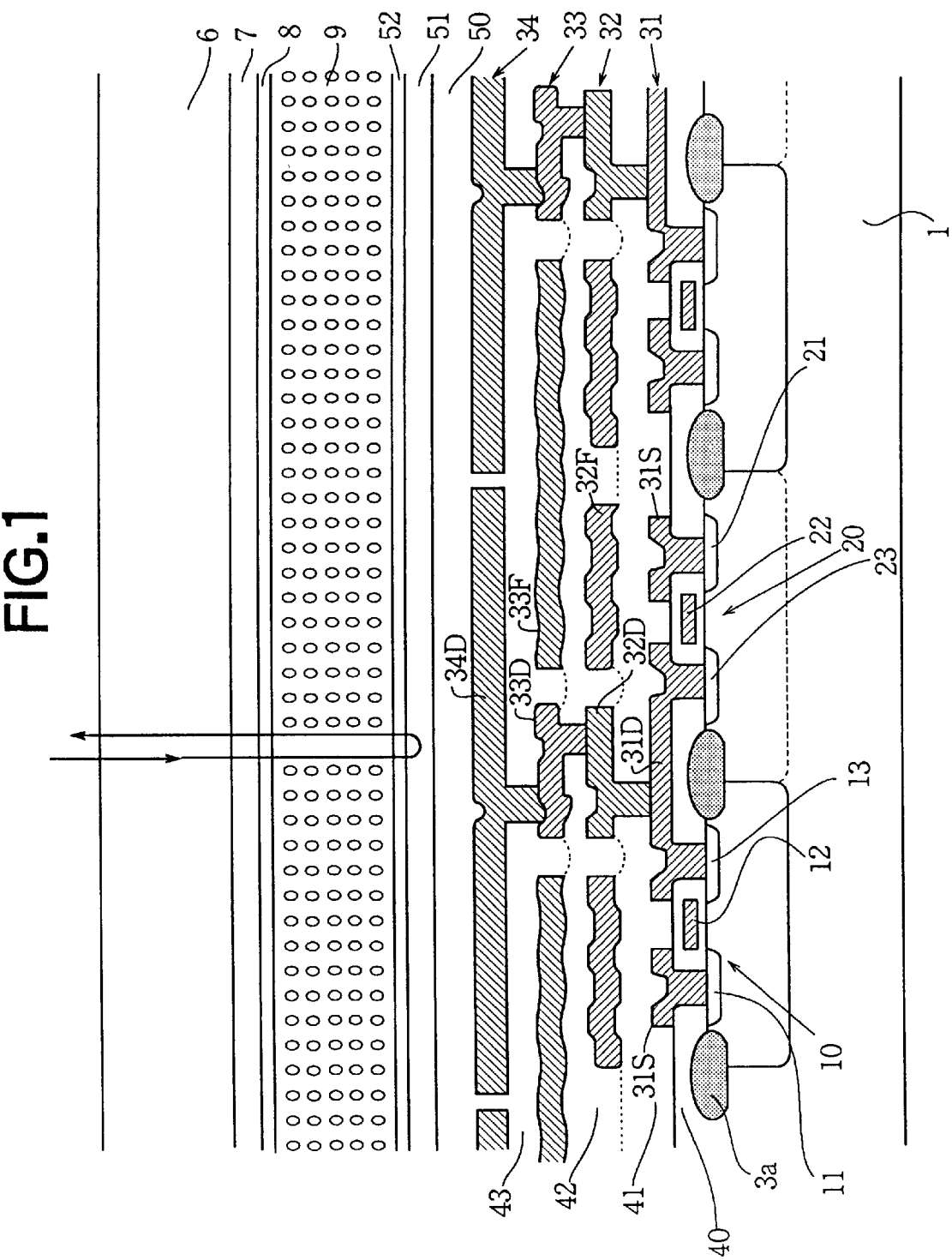
FIG. 1 is a sectional view showing a part of a reflection LCD panel according to the present invention.
Figure 10:
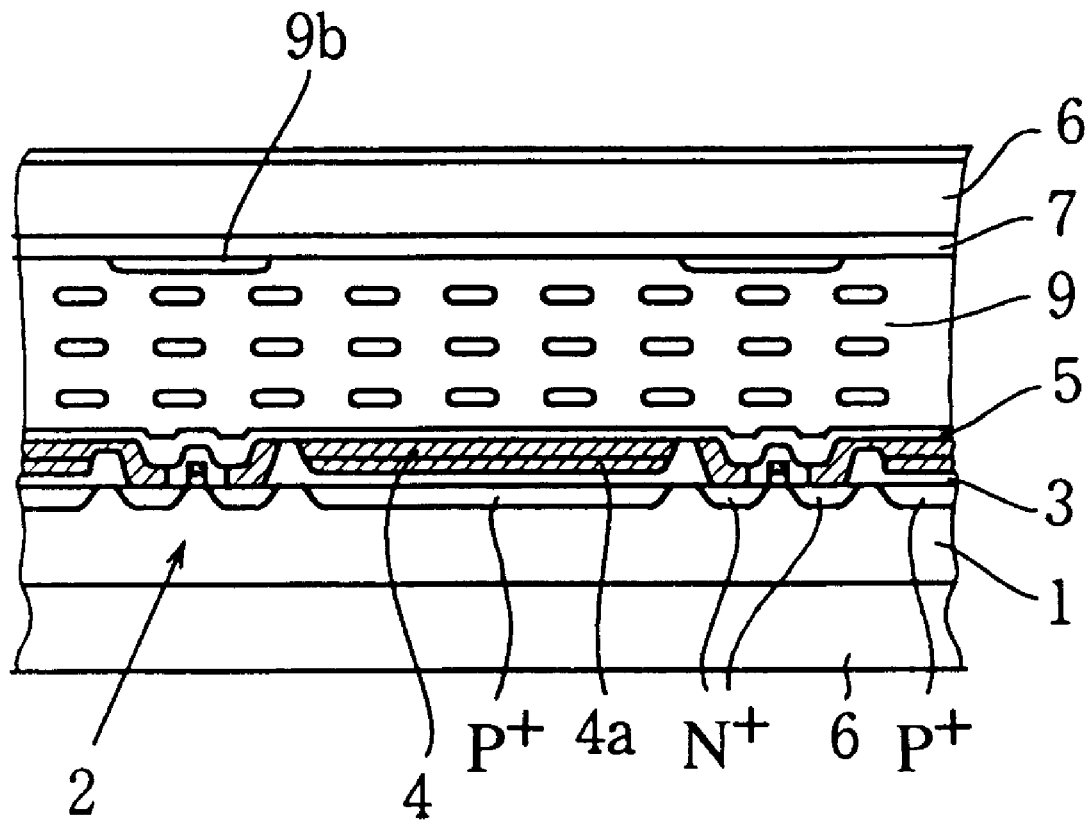
FIG. 10 is a sectional view of a conventional reflection LCD panel.
Figure 11:
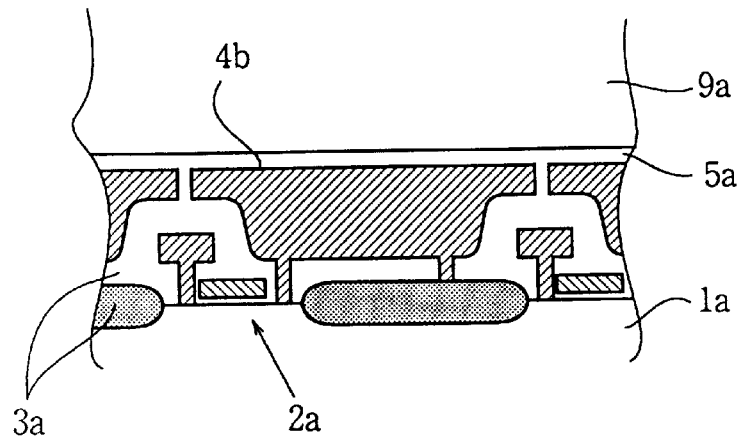
Figure 11:
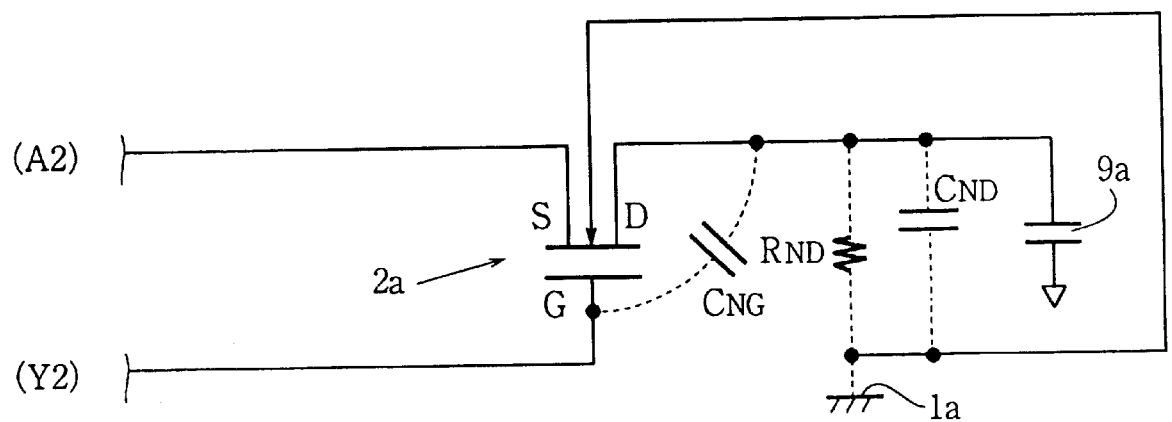
Figure 12:
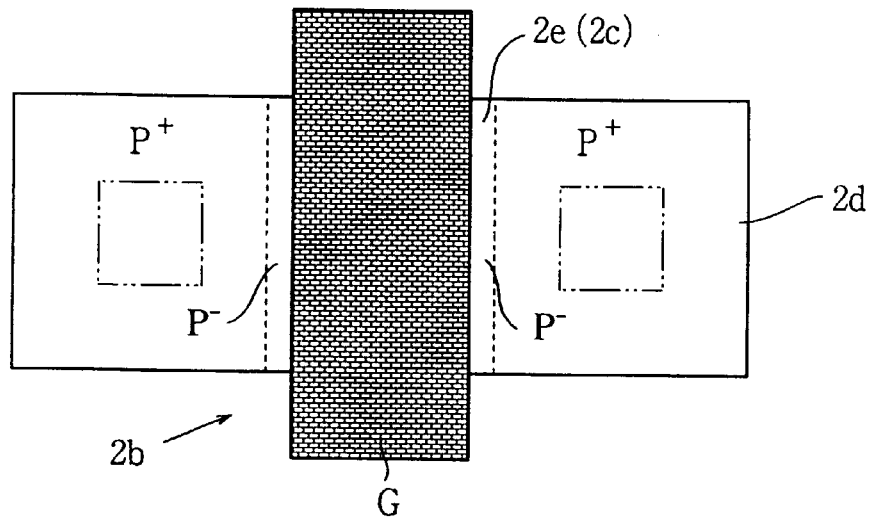
Figure 12:
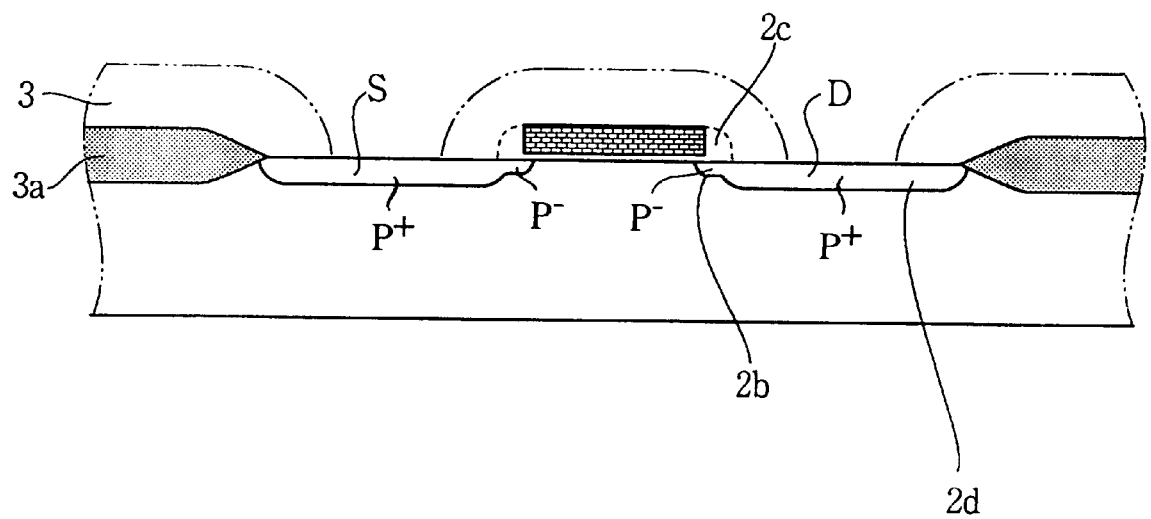

Referring to FIG. 1, an LCD panel according to the present invention comprises the p-type silicon substrate 1, the glass substrate 6 opposite the silicon substrate 1, interposing spacers in some parts thereof, and the liquid crystal layer 9 sealed between the substrates 1 and 6 by vacuum absorption. The substrate 6 may be made of quartz. The liquid crystal layer 9 comprises a plurality of STN-type or FLC-type nematic liquid crystal molecules in homeotropic alignment. On the substrate 6, there is provided the transparent electrode 7 such as an ITO film which is maintained at a common voltage or grounded. Furthermore, on the electrode 7, alignment film 8 made of silicon oxide is formed by angle evaporation. The black matrix 9b provided in the conventional display panel shown in FIG. 10 is obviated.

On the silicon substrate 1 are provided a plurality of transfer gates as switching elements for driving pixels, and a plurality of pixel electrodes 34D, both of which are aligned in matrixes. The pixel electrodes 34D are formed in a densely disposed pattern with only a very small insulation distance between each electrode.

In accordance with the present invention, each transfer gate comprises a pair of p-channel MOSFET 10 and an n-channel MOSFET 20. The field oxidation film 3a is provided between the MOSFETS 10 and 20.

Each of the p-channel MOSFETs 10 comprises a source 11 which is applied with a data signal through a source line 31S, a polysilicon gate 12 to which is applied a scanning pulse, and a drain 13. The corresponding n-channel MOSFET 20 comprises a source 21 to which is applied the data signal through the source line 31S, a polysilicon gate 22 to which is applied a scanning pulse, and a drain 23 which is connected to the drain 13 of the MOSFET 10 through a drain line 31D. The drain line 31D is further connected to the pixel electrode 34D through drain lines 32D and 33D, which are layered one on the other.

Namely, the source lines 31S and the drain lines 31D form a wiring layer 31, which is mounted on the substrate 1 interposing an insulation film 40. The drain lines 32D form a wiring layer 32 which is formed on the wiring layer 31, the drain lines 33D form a wiring layer 33 formed on the wiring layer 32, and the pixel electrodes 34D form the pixel electrode layer 34. Between-layer insulation films 41, 42 and 43 are interposed between the insulation film 40 and the wiring layer 32, wiring layers 32 and 33, and between the wiring layer 33 and the electrode layer 34, respectively. Each of the wiring layers 31, 32 and 33 and the pixel electrode layer 34 are films made of such conductive metals as aluminum, tungsten, aluminum alloy and layers of titanium and aluminum formed by sputtering, or evaporation or photolithography. Each of the insulation films 40, 41, 42 and 43 is made of a phosphorus silicate glass (PSG) of the same composition. In order to dispose the pixel electrode 34D horizontally, and to obtain a uniform electric field, the surface of the between-layer insulation film 43 is chemically and mechanically ground.

On the pixel electrode layer 34 is formed a protection film 50 comprising a silicon oxide film or a silicon nitride film. A dielectric mirror 51 for reflecting incident light as shown by an arrow in FIG. 1 is provided on the protection layer 50. A silicon oxide film as an alignment film 52 is formed on the dielectric mirror 51 under the liquid crystal layer 9 by angle evaporation.

The reflection LCD panel of such a construction can be manufactured in accordance with a silicon process or the LCD panel manufacturing process for manufacturing the ordinary CMOS devices. In accordance with the present invention, when patterning the wiring layers 32 and 33 to form the drain lines 32D and 33D, respectively, portions surrounding the drain lines 32D and 33D are removed by etching. These portions have minimum widths sufficient for insulation and for processing. More particularly, in order to provide sufficient insulation, it it necessary that the adjacent drain lines are disposed apart from each other with respect not only to the static insulation, but also to the conditions thereof when driven. These spaces are also necessary for the stable manufacturing. Hence, the larger of the required width is selected. The spaces may be filled with insulation materials.

In other portions, dummy layers 32F and 33F are formed corresponding to the wiring layers 32 and 33. Since the dummy layers 32F and 33F exist, influences of bumps caused by the drain lines 32D and 33D are reduced so that the pixel electrode 34D is formed on a relatively even surface. Thus the surface of the pixel electrode 34D is sufficiently flat. The dummy layers 32F and 33F can thus be formed without introducing an additional manufacturing process.

The dummy layers 32F and 33F are provided with additional outgoing wiring patterns which are in common connections with the transparent electrode 7. Hence the dummy layers have the same potential as the transparent electrode 7, or the direct current potential of the supply voltage. The dummy layers hence serve as additional capacitors together with the pixel electrodes 34D provided adjacent the layer 33F interposing the between-layer insulation film 43. Accordingly, storage capacitor electrodes generally provided in the conventional LCD panel such as the storage capacitor electrodes 4a shown in FIG. 10 need not be provided, thus simplifying the manufacturing process of the panel.

A further advantage of the dummy layers 32F and 33F is that the layers are disposed under the gaps formed between the adjacent pixel electrodes 34D. Hence the incident light leaking through these gaps is prevented from reaching the MOSFETs 10 and 20.

In order to render the reflecting surface of the dielectric mirror 51 flat with a minimum of the additional process, after the pixel electrode layer 34 is formed, the layer 34 is chemically and mechanically ground for a short time. The protection film 50 is likewisely chemically and mechanically ground to obtain a mirror polish. It is sufficient to polish the layer 34, insulation film 43 and the protection film 50 only slightly.

The p-channel MOSFET 10 and the n-channel MOSFET 20 according to the present invention is described in detail with reference to FIGS. 5a, 5b, 6a, 6b and 7.

Figure 5:
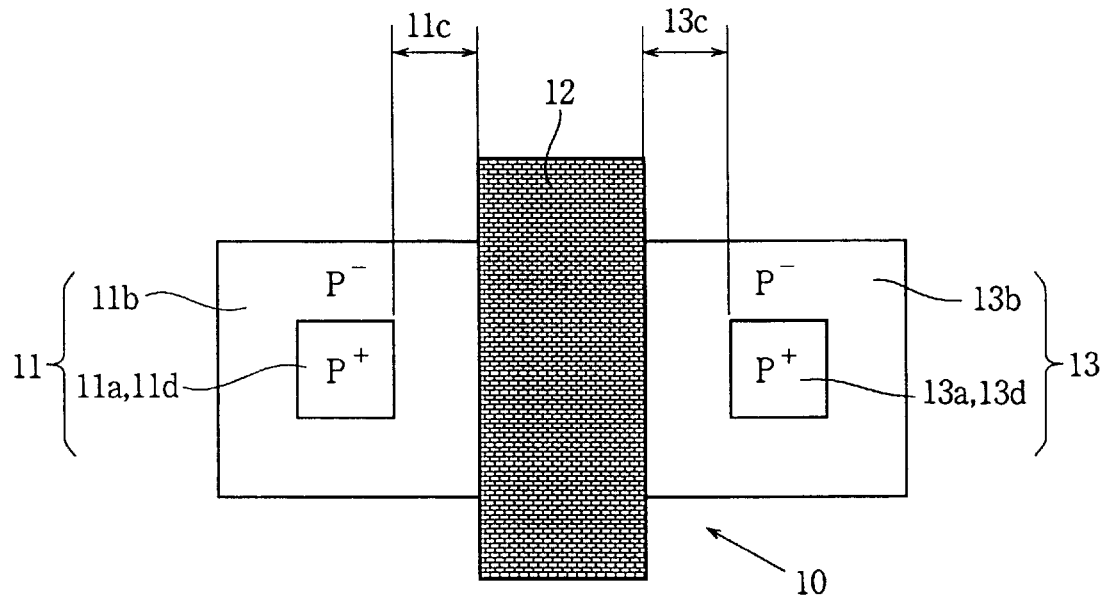
Figure 5:
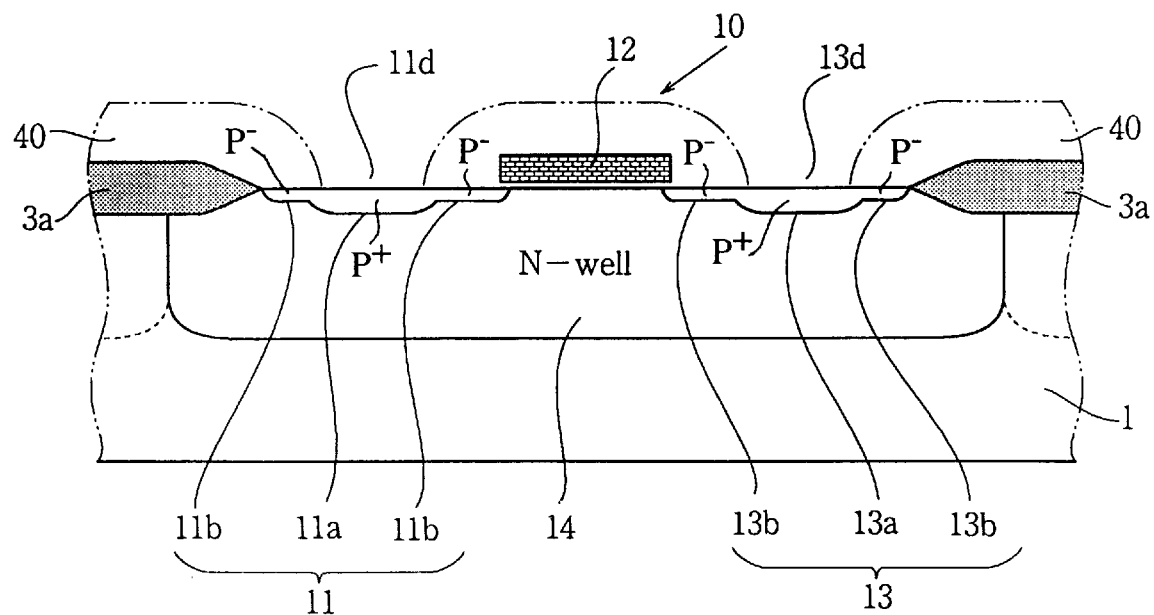

Referring to FIGS. 5a and 5b, the p-channel MOSFET 10 is disposed in an N-well 14 formed on the upper surface of the silicon substrate 1, and isolated from the rest of the surface by the field oxidation film 3a. The MOSFET 10 has the gate 12, a region for the source 11 at one of the sides of the gate, and a region for the drain 13 at the other side. The source 11 comprises an annular lightly doped region 11b in a space between the gate 12 and the field oxidation film 3a, and a highly doped region 11a surrounded by the lightly doped region 11b. A contact hole 11d formed in the insulation film 40 directly above the highly doped region 11a.

Similarly, the drain 13 comprises an annular lightly doped region 13b in a space between the gate 12 and the field oxidation film 3a, and a highly doped region 13a surrounded by the lightly doped region 13b. A contact opening 13d is formed in the insulation film 40 directly above the highly doped region 13a.

Figure 13:
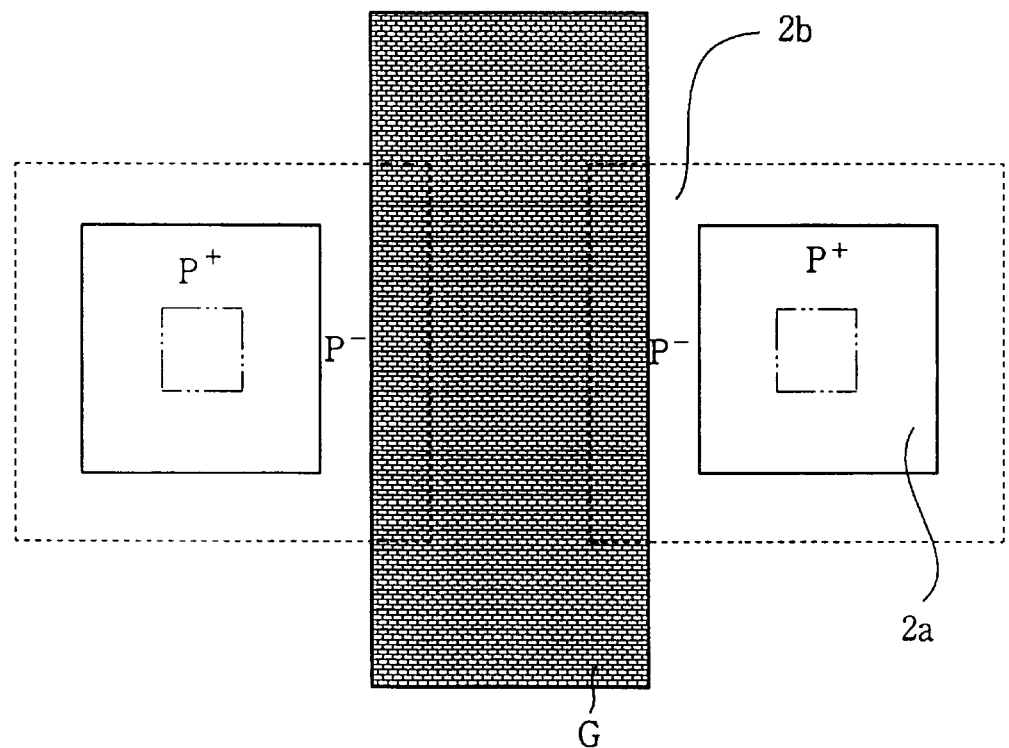
Figure 13:
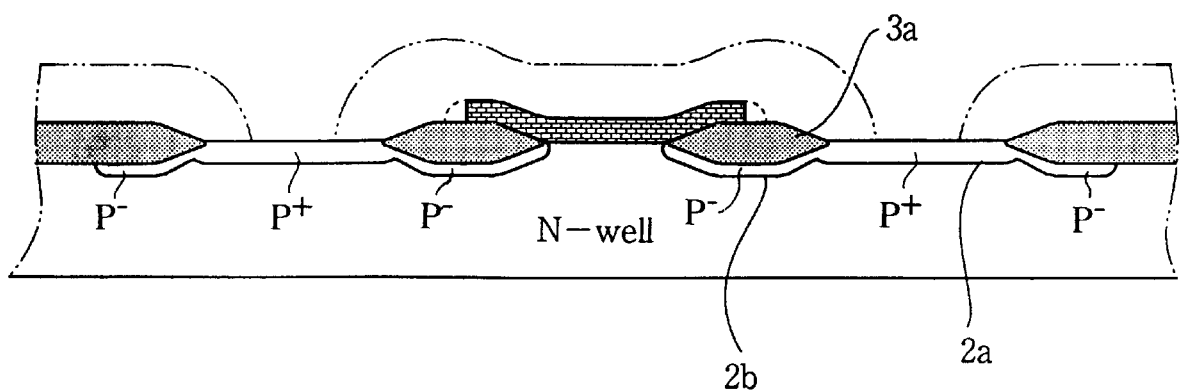

In order to produce a MOSFET capable of receiving the liquid crystal driving voltage of 25V, which is larger than the withstand voltage of the MOSFET having the LDD structure, it is necessary that a length 11c, which corresponds to the width of the lightly doped region 11b as shown in FIG. 5a is about 1.2 $\mu$m. A length 13c, which corresponds to the width of the lightly doped region 13b of the drain 13 is also set to about the same length. Hence the lengths 11c and 13c are shorter than the length of the lightly doped region 2e in the convention drift channel structure, which is about 2.4 $\mu$m as described with reference to FIG. 13b. Moreover, the withstand voltage is increased more than in the LDD transistors.

Figure 6:
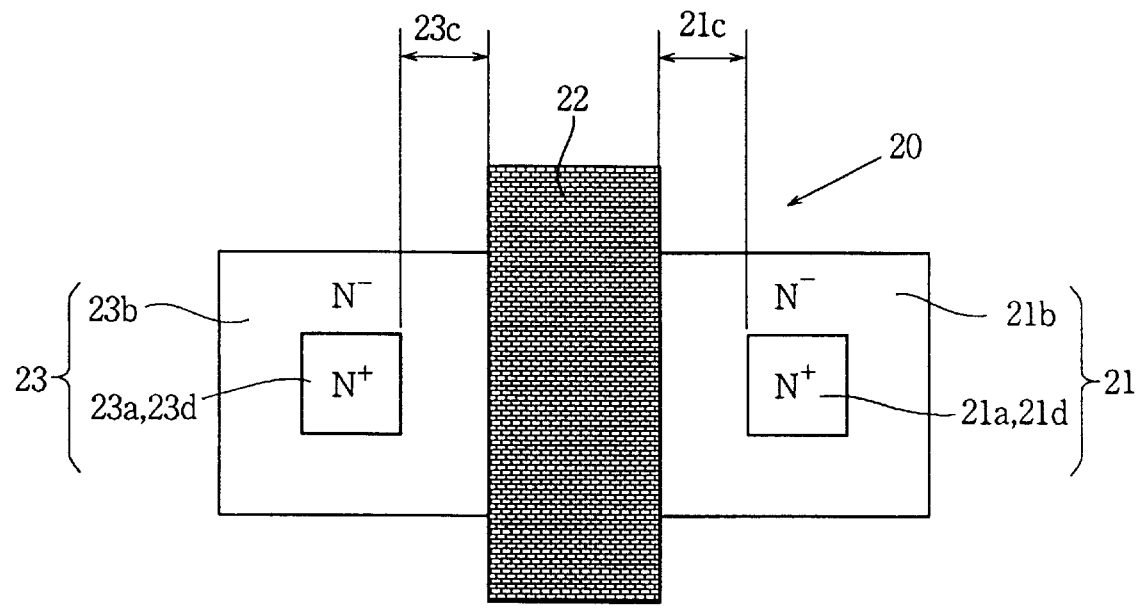
Figure 6:
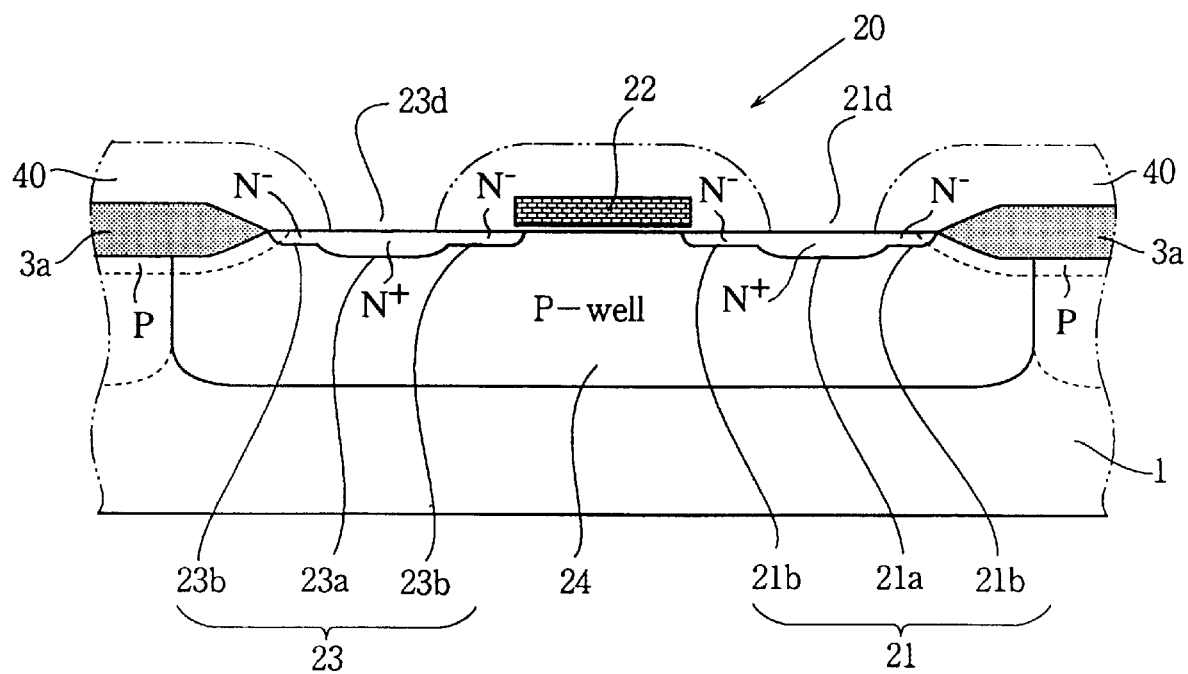

As shown in FIGS. 6a and 6b, the n-channel MOSFET 20 has a similar construction as the p-channel MOSFET 10. Namely, in a P-well 24, there is provided the source 21, gate 22 and the drain 23. The source 21 has an annular lightly doped region 21b in a space between the gate 22 and the field oxidation film 3a, and a highly doped region 21a in the middle of the lightly doped region 21b. The drain 23 comprises an annular lightly doped region 23b, and a highly doped region 23a in the middle of the lightly doped region 23b. Contact openings 21d and 23b are formed in the insulation film 40 directly above the highly doped region 21a and the highly doped region 23a, respectively. Lengths 21c and 23c, which correspond to the widths of the lightly doped regions 21b and 23b, respectively, are about 1.2 $\mu$m, respectively. The n-channel MOSFET has the same advantages as the p-channel MOSFET.

Thus the MOSFETs 10 and 20 of the present invention have higher withstand voltages than the MOSFETs of the LDD structure and shorter lengths than those of the drift channel structure. Consequently, the MOSFETs are appropriate for the miniaturized LCD panel.

Figure 7:
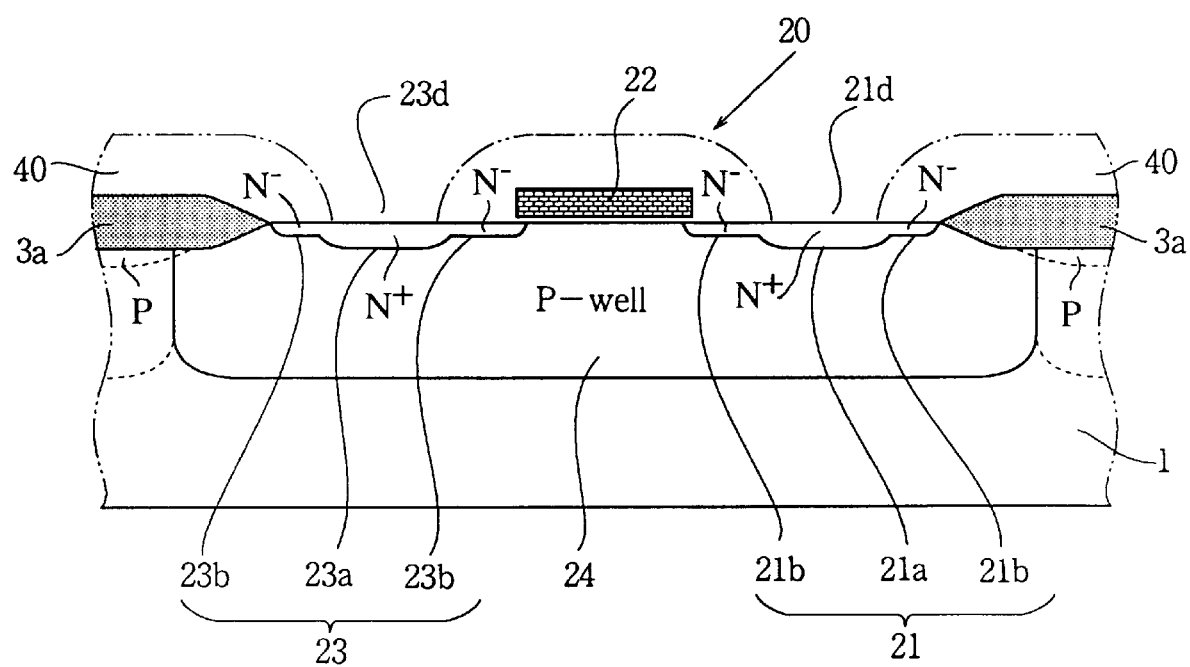
FIG. 7 is a sectional view of a modification of the n-channel MOSFET of the present invention.

FIG. 7 shows a modification of the n-channel MOSFET 20. In the modification, edges of a p-layer which is formed under the field oxidation film 3a do not reach the lightly doped regions 21b and 23b. Other construction and properties are the same as the MOSFET shown in FIG. 6b.

Figure 8:
FIGS. 8a to 8e are sectional views describing the steps for manufacturing the MOSFET of the present invention.
Figure 8:
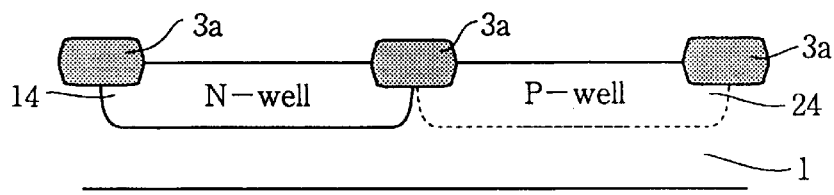
Figure 8:
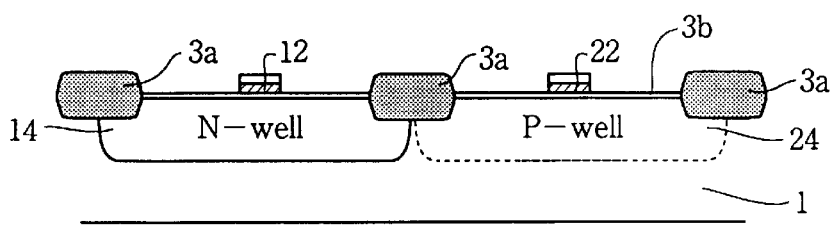
Figure 8:
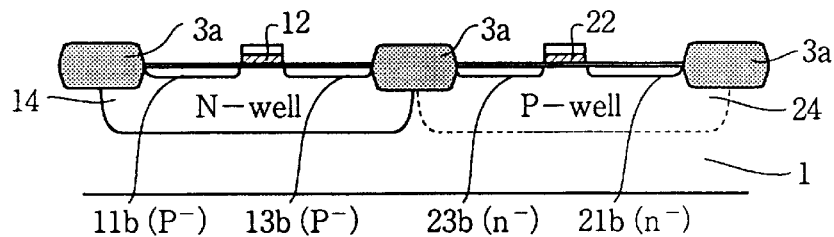
Figure 8:
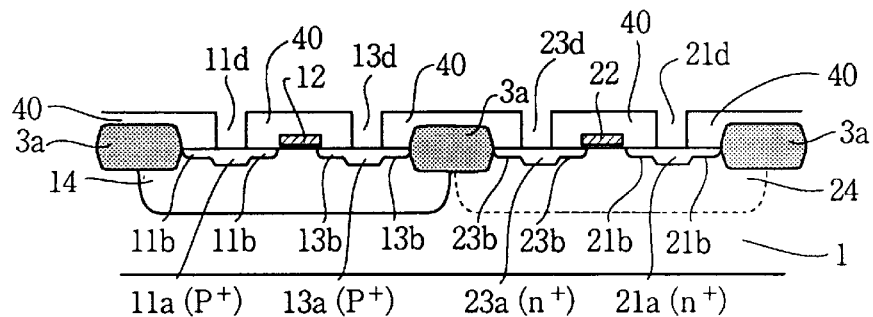
Figure 9:
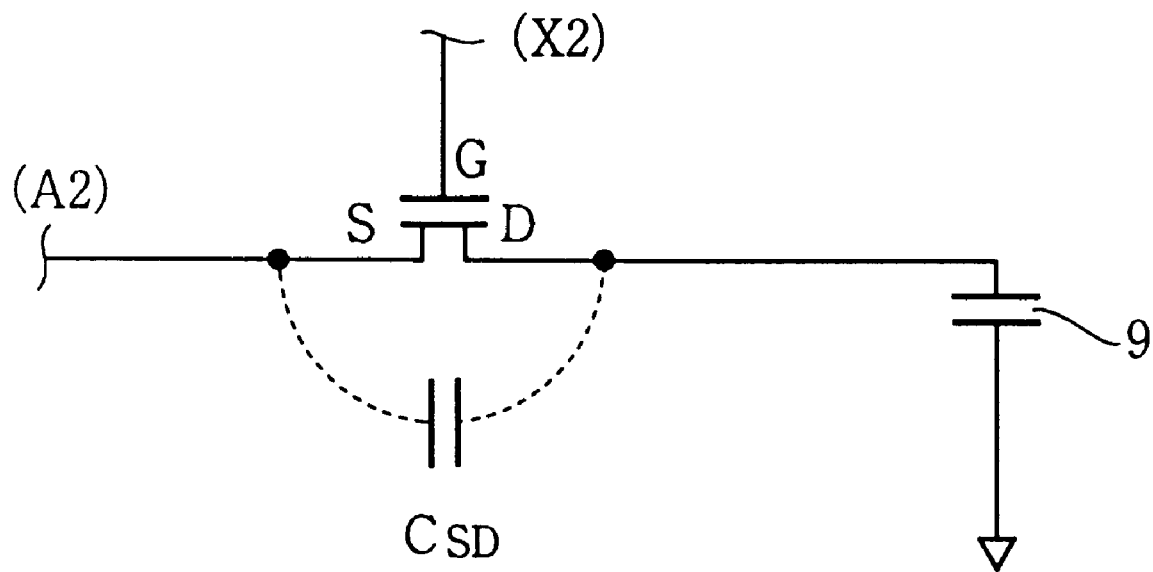
FIG. 9 is a circuitry of a TFT provided in a conventional LCD panel.

Steps for manufacturing the MOSFETs 10 and 20 will now be described hereinafter with reference to FIGS. 8a to 8e. First of all, the silicon substrate 1 is covered with photoresist and then patterned by such processes as the photolithography. Phosphorus is injected by ion implantation, thereby forming the N-well 14 as shown in FIG. 8a. Boron is injected, also by ion implantation, thereby forming the P-well 24. It is hence possible to set the areas of the wells smaller than those of the MOSFETs of the drift channel structure.

As shown in FIG. 8b, the areas surrounding the N-well 14 and the P-well 24 are treated in accordance with the local oxidation of silicon (LOCOS) technique, thereby forming the field oxidation film 3a of silicon oxide ($SiO_2$) for isolation. The upper surfaces of the wells 14 and 24 are applied with thin gate oxidation films 3b. Thereafter, as shown in FIG. 8c, at a substantially center of each of the wells, there is mounted a stacked pattern comprising the gate electrodes 12 and 22 and an insulation film thereof by CVD or the photolithography.

A small doze of boron, which is a p-type conductive impurity, is ion-implanted in the N-well 14 as shown in FIG. 8d. The stacked pattern of the gate 12, field oxidation film 3a and a photoresist formed on the P-well 24 serve as masks at the ion implantation. Similarly, a small doze of phosphorus, which is an n-type conductive impurity, is injected in the P-well 24 by ion implantation, using, as the masks, the stacked pattern of the gate 22, field oxidation film 3a and a photoresist formed on the N-well 14. As a result, there are formed the lightly doped regions 11b and 13b ($p^-$) in the well 14, and the lightly doped regions 21b and 23b ($n^-$) in the well 24.

The insulation film 40 of silicon oxide ($SiO_2$) or phosphorous silicate glass (PSG) is then formed on the silicon substrate 1 by the CVD technique. The contact opening 11d for connecting the source 11 with the source line 31S and the contact hole 13d for connecting the drain 13 with the drain line 31D (FIG. 1) are formed in the insulation film 40 by photolithography or by etching. The contact openings 21d and 23d are likewisely formed in the insulation film 40.

Thereafter, a large dose of boron is ion-implanted in the well 14 of the substrate 1, using the insulation film 40 and the photoresist formed on the surface of the well 24 as masks. Hence, as shown in FIG. 8e, there is formed on the bottom of the contract hole 11d, the highly doped region 11a ($p^+$) which has the same type of conductive impurities as the lightly doped region 11b ($p^-$). The highly doped region 13a ($p^+$) having the same type of conductive impurities is formed on the bottom the contact hole 13d.

Similarly, a large dose of phosphorus is ion-implanted in the well 24 of the substrate 1, using the insulation film 40 and the photoresist formed on the surface of the well 14 as masks. Hence, the highly doped region 21a (n$^+$) which has the same type of conductive impurities as the lightly doped region 21b (n$^-$) is formed on the bottom of the contact hole 21d. The highly doped region 23a (n$^-$) having the same type of conductive impurities is also formed on the bottom the contact hole 23d.

The position of each of the contact holes 11d, 13d, 21d, and 23d are so designed in accordance with the pattern, that the lengths 11c, 13c, 21c, and 23c are about 1.2 μm as described above with reference to FIGS. 5a, 5b, 6a and 6b. Thus sufficient distance is provided between the edge of each of the gates 12 and 22 and the edge of each of the highly doped regions 11a, 13a, 21a and 23a, so as to render the withstand voltage of the MOSFETs 10 and 20 higher than the liquid crystal driving voltage.

Thereafter, wiring layers 31, 32 and electrode layer 34, and between-layer insulation films 41, 42, 43 are formed, thereby completing the MOSFETs 10 and 20 on the silicon substrate 1 as shown in FIG. 1.

The operation of the reflection LCD panel is described hereinafter with reference to FIGS. 2, 3, 4a and 4b.

Figure 2:
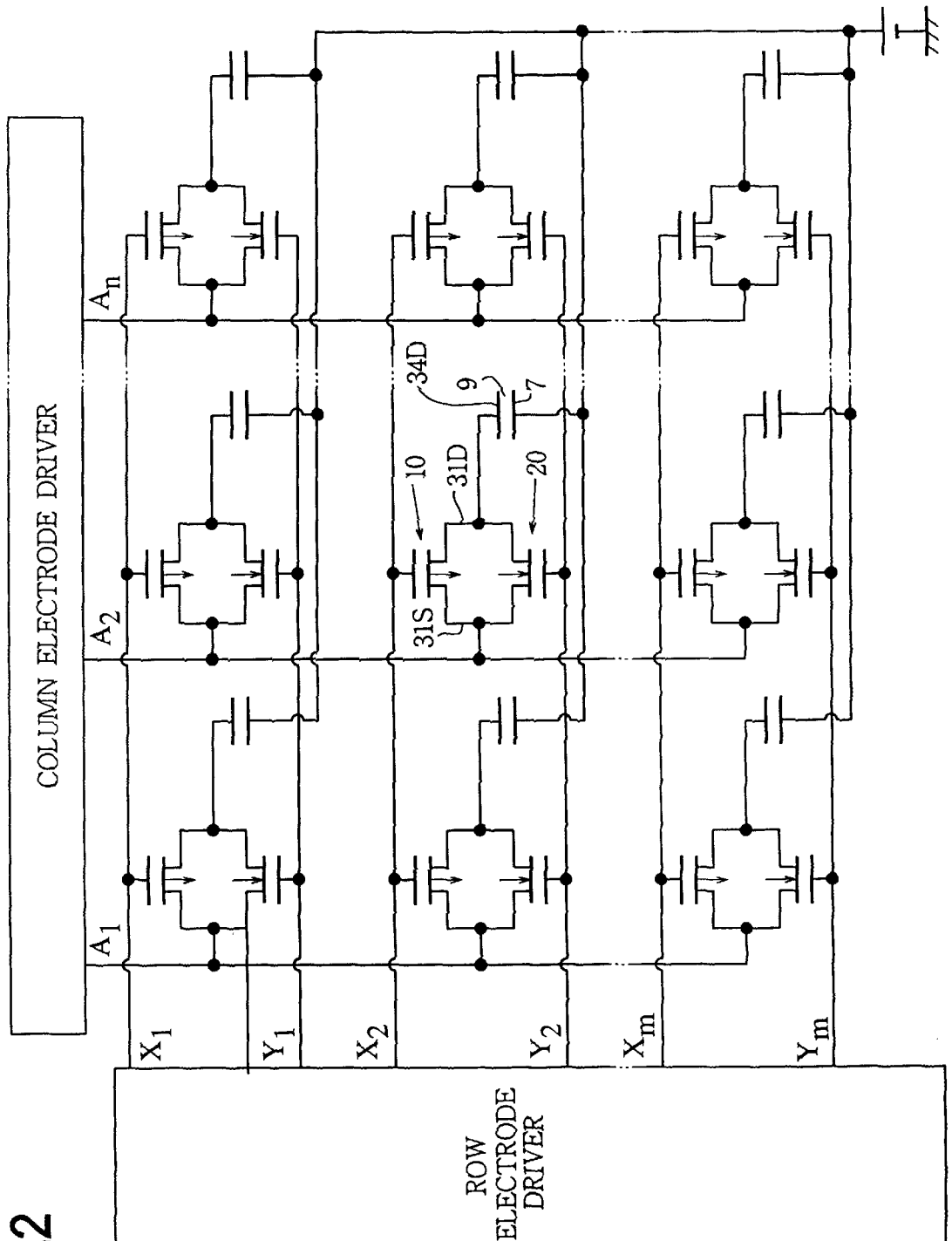
FIG. 2 is a schematic diagram showing an equivalent circuit of the LCD panel of FIG. 1.

Referring to FIG. 2, showing the equivalent circuit of the LCD panel of the present invention, there is provided a plurality of data electrodes $A_1$, $A_2$ . . . $A_n$ as column electrodes, and a plurality of pair of row electrodes comprising scanning electrodes $X_1$, $X_2$ . . . $X_m$, and scanning electrodes $Y_1$, $Y_2$ . . . $Y_m$. The scanning electrodes $X_m$ are connected to the p-channel MOSFETs 10 and the scanning electrodes $Y_m$ are connected to the n-channel MOSFETs 20. Each pair of scanning electrodes $X_m$ and $Y_m$ corresponds to one scanning line. Each of the scanning electrodes $X_m$ and $Y_m$ is connected to a row electrode driver and each of the data data electrode $A_n$ is connected to a column electrode driver. At each intersection of the data electrode and the pair of the scanning electrodes is provided one pixel in the form of the liquid crystal layer 9.

Figure 3:
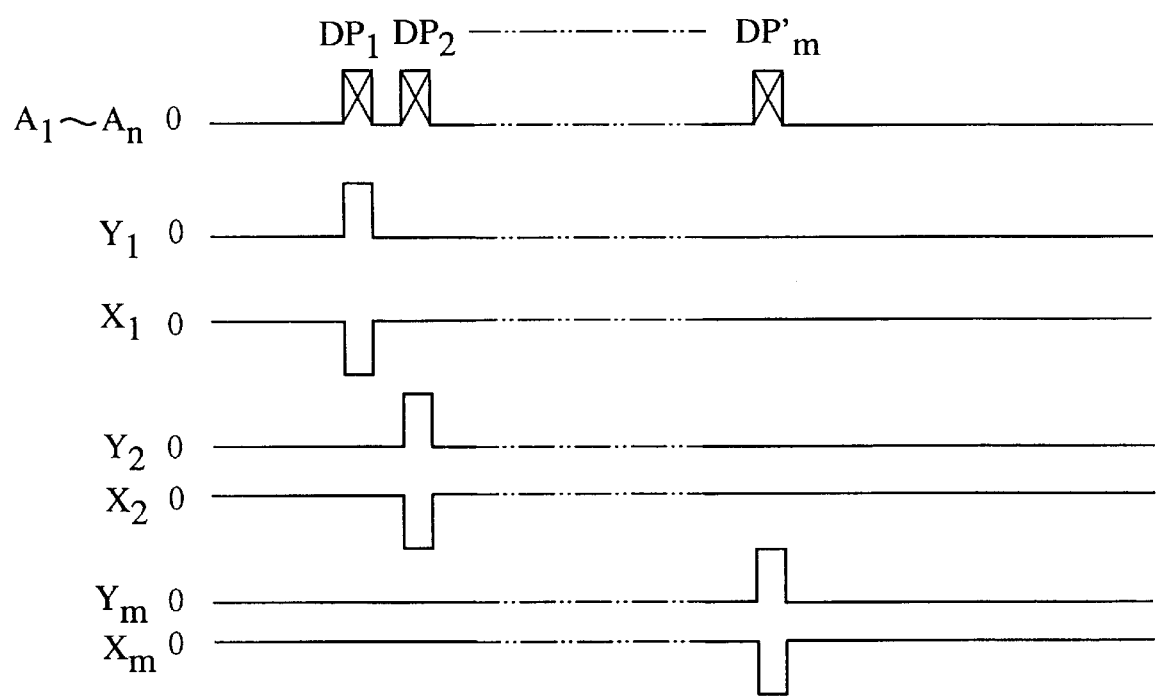
FIG. 3 is a graph showing waveforms of driving signals applied to the LCD panel.

As shown in FIG. 3, data signals in the form of pulses DP1, DP2 . . . DPm are parallelly fed to the data electrodes $A_n$. Meanwhile, positive and negative scanning pulses are simultaneously fed to the pairs of scanning electrodes $X_m$ and $Y_m$ one by one.

Figure 4:
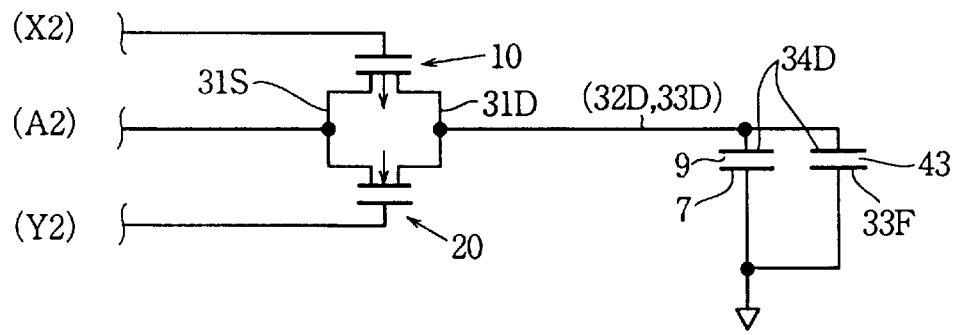
Figure 4:
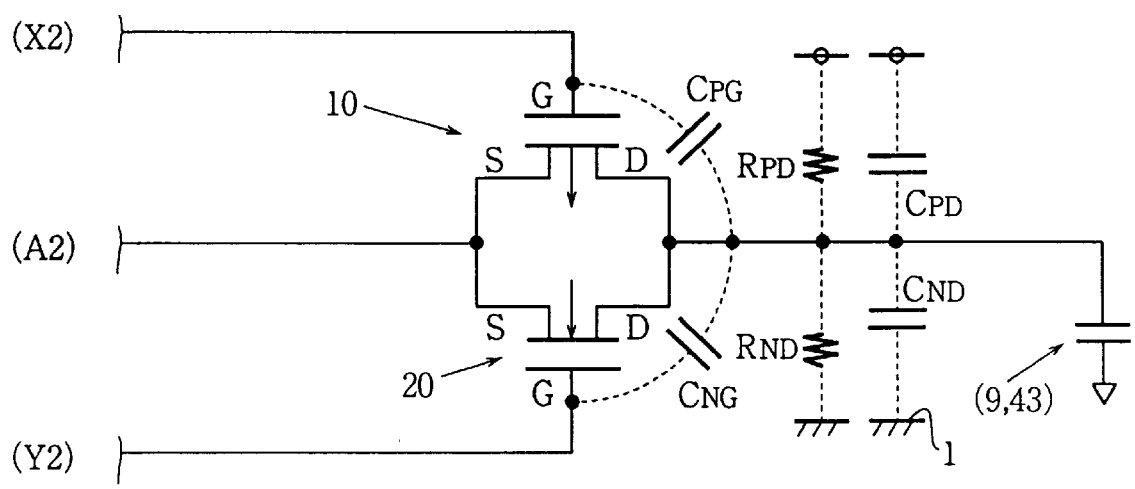

Referring to FIG. 4a, showing a pixel at the second row, second column as an example, when the gate 12 of the p-channel MOSFET 10 is applied with a negative scanning pulse through the scanning electrode $X_2$, and the gate 22 of the n-channel MOSFET 20 is applied with a positive scanning pulse through the scanning electrode $Y_2$, both of the MOSFETs 10 and 20 are rendered conductive. As a result, the source 11 and the drain 13 of the MOSFET 10, and the source 21 and drain 23 of the MOSFET 20 are connected with each other. A data signal applied through the data electrode $A_2$ is hence transmitted to the pixel electrode 34D through the source line 31S, MOSFETs 10 and 20 and drain lines 31D, 32D and 33D. Electric currents flow through the source 11 and the drain 13, and through the source 22 and the drain 23 in an electric field, the intensity of which is reduced due to the lightly doped regions 11b, 13b, 21b and 23b. Hence the flow rate of the current is substantially even so that the voltage applied to the MOSFETs is kept even.

When the gates 12 and 22 of the p-channel MOSFET 10 and the n-channel MOSFET 20 are applied with an earth potential, the MOSFETs 10 and 20 become inconductive. A parasitic capacitance is generated between the pixel electrode 34D and the dummy layer 33F provided under the pixel electrode 34D and connected to the transparent electrode 7. Hence the voltage of the data signal is maintained without decreasing.

In the molecules of the liquid crystal layer 9 above the pixel electrode 34D corresponding to a particular pixel, the polarization changes in accordance with the difference between the voltage applied to the pixel electrode 34D and the common voltage at the transparent electrode 7. As shown by the arrow in FIG. 1, the incident light from a light source (not shown) reflects by the reflecting surface, and transmitted to a projection surface (not shown). The ratio of the reflected light transmitted through the liquid crystal layer 9 is controlled with the polarization of the liquid crystal layer 9. A part of the incident light is further transmitted through a gap formed between the pixel electrodes 34D as shown in FIG. 1. However, the light is blocked by the dummy layer 33F, thereby protecting the MOSFETs 10 and 20.

Since the surface of the pixel electrode 34D is flat, the applied electric field of the liquid crystal layer 9 is even. Moreover, the dielectric mirror 51 is horizontally disposed, so that the reflecting surface of the LCD panel becomes an optical mirror surface and the thickness of the liquid crystal layer 9 is uniform. As a result, light is extremely well reflected. A high resolution image can thus be projected without employing the black matrix.

Referring to FIG. 4b, upon operation, the negative scanning pulse applied to the gate 12 of the MOSFET 10 causes a leakage voltage which flows toward the pixel electrode 34D through the scanning electrode $X_2$ and a parasitic capacitance $C_{PG}$ generated between the gate 12 and the drain 13. On the other hand, since the positive scanning pulse is applied to the gate 22 of the MOSFET 20, thereby generating a parasitic capacitance $C_{NG}$, the leakage voltage is drained through the parasitic capacitance $C_{NG}$ to the scanning electrode $Y_2$. Accordingly the liquid crystal driving voltage applied to the pixel electrode 34D is hardly affected by undesirable leakage of signals for driving the MOSFETs.

While the MOSFETs 10 and 20 are inconductive, the voltage at the N-well 14 of the p-channel MOSFET 10 is pulled up to the supply voltage so that a leakage current flows from the well 14 toward the pixel electrode 34D through a parasitic resistance $R_{PD}$ generated at a p-n junction between the well 14 and the drain 13. Since the well 24 of the n-channel MOSFET 20 or the silicon substrate 1 is grounded, there is generated a parasitic resistance $R_{ND}$ at a p-n junction between the silicon substrate 1 and the drain 23. Hence the leakage current is drained to the ground from the pixel electrode 34D through the parasitic resistance $R_{ND}$. Thus the liquid crystal driving voltage fed to the pixel electrode 34D is further prevented from fluctuation which is caused by the undesirable leakage.

Since the leakage is retrained, resulting in stable stabilization of the liquid crystal driving voltage, the capacitance for holding the voltage need not be large. Hence the parasitic capacitance generated between the pixel electrode 34D and the dummy layer 33F is sufficient to prevent the decline of the voltage.

The liquid crystal driving voltage at the pixel electrode 34D is thus stably maintained until the next scanning pulse is applied. The polarization of the liquid crystal layer 9 accordingly becomes stable so that the incident light and reflected light passing through the liquid crystal layer 9 are stably polarized without causing fluctuations.

The present invention may be applied to the LCD panel having the black matrix disposed on the glass substrate 6. Since an excellent reflecting characteristic is obtained due to the flat reflecting surface, the black matrix is enough to be disposed only at portions corresponding to the very small gaps between the densely populated pixel electrodes 34D. Hence the decrease of the aperture ratio is prevented.

The transistor of the present invention may be applied to a semiconductor device operated with a supply voltage of about 20 volts, such as an IC of an LCD driver.

From the foregoing it will be understood that in the reflection LCD panel of the present invention, dummy layers are formed in the layers between the pixel electrode layer and the substrate so that the pixel electrode layer can be horizontally and evenly disposed. Accordingly, the reflecting surface of the panel becomes flat, thereby improving the reflecting characteristics of light such as the reflectance and the polarization controllability. In order to render the reflecting surface more precisely, the surfaces of the pixel electrode layer, the insulation films disposed between the wiring layers, and the protection layer disposed on the pixel electrode layer are slightly ground, and furthermore, the dielectric mirror is disposed on the protection layer. When the surface of the pixel electrode layer is ground, the electric field exerted on the liquid crystal layer becomes even more constant. The dummy layers further block the incident light from the MOSFETs. Moreover, the dummy layer disposed directly between the switching element and the pixel electrode serves as a storage capacitor electrode for storing the voltage when the MOSFETs are inconductive. Hence the liquid crystal layer can be accurately controlled.

Since the switching element for driving each pixel comprises a pair of MOSFETs which are operated complementarily of each other, undesired factors such as capacitance and resistance which cause fluctuations of the liquid crystal driving voltage are canceled.

Furthermore, in the MOSFET according to the present invention, the widths of the lightly doped regions of the source and the drain surrounding the highly doped regions are determined so that the withstand voltage thereof becomes larger than the liquid crystal driving voltage applied to the liquid crystal layer through the MOSFET. The length can be made shorter than those of the MOSFET of the drift channel structure. Hence, the LCD panel can be miniaturized.

The above described advantages of the present invention can be easily realized without largely changing the processes for manufacturing the conventional transistors and the LCD panel.

While the invention has been described in conjunction with preferred specific embodiment thereof, it will be understood that this description is intended to illustrate and not limit the scope of the invention, which is defined by the following claims.

What is claimed is:

1. A reflection liquid crystal display device having a semiconductor substrate, comprising:

a plurality of switching elements arranged on the semiconductor substrate in a matrix;

a plurality of pixel electrodes above the plurality of switching elements and arranged in a matrix corresponding to the plurality of switching elements;

a unit of wiring layers connecting a unit of the plurality of switching elements with each other and connecting the unit of the plurality of switching elements with a corresponding pixel electrode;

a liquid crystal layer on the plurality of pixel electrodes; and a unit of dummy layers in a same level as the unit of wiring layers so that an uppermost surface of the unit of dummy layers is substantially flush with an uppermost surface of the unit of wiring layers, the unit of dummy layers forming a storage capacitor together with the corresponding pixel electrode.

2. The device according to claim 1, wherein surfaces of the plurality of pixel electrodes on a side of the liquid crystal layer are ground substantially flat.

3. The device according to claim 1, further comprising a protection layer having a ground flat surface on the plurality of pixel electrodes.

4. The device according to claim 3, further comprising a dielectric mirror on the protection layer.

5. A reflection liquid crystal display device having a semiconductor substrate, comprising:

a plurality of switching elements arranged on the semiconductor substrate in a matrix;

a plurality of pixel electrodes above the plurality of switching elements and arranged in a matrix corresponding to the plurality of switching elements;

a unit of wiring layers connecting a unit of the plurality of switching elements with each other and also connecting the unit of the plurality of switching elements with a corresponding pixel electrode, the unit of wiring layers further including a dummy layer having an upper surface flush with an upper surface of the unit of wiring layers and forming a storage capacitor with a corresponding pixel electrode;

a liquid crystal layer on the plurality of pixel electrodes; and a p-channel MOSFET and an n-channel MOSFET connected to form a transfer gate for the corresponding pixel electrode and forming the unit of the plurality of switching elements.

6. A liquid crystal display device comprising:

a first switching element of a first conductivity type on a semiconductor substrate;

a second switching element of a second conductivity type on the semiconductor substrate;

a pixel electrode disposed over the first and second switching element;

a wiring layer for connecting the first switching element to the second switching element and for connecting the first and second switching elements to the pixel electrode, the wiring layer including a dummy layer having an upper surface flush with an upper surface of the wiring layer, the dummy layer forming a storage capacitor together with the pixel electrode; and a liquid crystal layer disposed over the pixel electrode.

7. The liquid crystal display device of claim 6, wherein the first switching element of the first conductivity type is a p-channel MOSFET.

8. The liquid crystal display device of claim 7, wherein the second switching element of the second conductivity type is an n-channel MOSFET.

9. The liquid crystal display device of claim 8, wherein the p-channel MOSFET includes a source and a drain each having a lightly doped region and a heavily doped region, and wherein the n-channel MOSFET includes a source and a drain each having a lightly doped region and a heavily doped region.

10. The liquid crystal display device of claim 9, wherein an edge of a p-layer formed under a field oxidation film of the p-channel MOSFET is offset from the lightly doped regions of the source and the drain of the n-channel MOSFET.

11. The liquid crystal display device of claim 6, further including a protection layer on the pixel electrode.

12. The liquid crystal display device of claim 11, further including a dielectric mirror on the protection layer.

13. The liquid crystal display device of claim 6, further including an alignment film over the liquid crystal layer.

14. The liquid crystal display device of claim 13, further including a transparent electrode over the alignment film.

15. The liquid crystal display device of claim 6, wherein an upper surface of the pixel electrode is ground substantially flat.

16. The liquid crystal display device of claim 14, further including a glass layer over the transparent electrode.

* * * * *